United States Patent [19]

Stickel

[11] Patent Number: 5,646,497

[45] Date of Patent: Jul. 8, 1997

[54] SWITCHING ARRANGEMENT FOR CONTROLLING THE RPM OF ELECTRIC MOTORS

[75] Inventor: Wolfgang Stickel, Beuren, Germany

[73] Assignee: Metabowerke GmbH & Co., Germany

[21] Appl. No.: 399,974

[22] Filed: Mar. 8, 1995

[30] Foreign Application Priority Data

Mar. 8, 1994 [DE] Germany ............................ 44 07 634.7

[51] Int. Cl.$^6$ ............................................................ G05F 5/02
[52] U.S. Cl. .................... 318/799; 388/840; 388/813; 318/244
[58] Field of Search ........................... 318/244, 245, 318/798, 799, 809; 388/805, 813, 820, 838–840

[56] References Cited

U.S. PATENT DOCUMENTS 4,703,248   10/1987   Kuhnemundt et al. .................. 323/300

FOREIGN PATENT DOCUMENTS 1 538 471   12/1969   Germany .
26 55 574    6/1978   Germany .

*Primary Examiner*—Brian Sircus
*Attorney, Agent, or Firm*—Jones, Tullar & Cooper, P.C.

[57] ABSTRACT

A switching arrangement for controlling the rpm constancy between idling and full power of universal motors in electric tools has a phase-shift control (IC) which, for setting the set value, is connected at an output via an adjusting resistor with a tap of a voltage divider, and whose trigger output controls an electronic power switch disposed in the electrical circuit of the motor. In order to obtain an optimal readjustment of the load in the entire provided rpm range by means of such a switching arrangement, it is provided that between the tap of the voltage divider and the one output of the phase-control circuit (IC) at least one further adjusting resistor is provided, with which a preferably electronic circuit device is switched in parallel, which is controlled from a point in the voltage divider.

8 Claims, 3 Drawing Sheets

1

SWITCHING ARRANGEMENT FOR CONTROLLING THE RPM OF ELECTRIC MOTORS

FIELD OF THE INVENTION

The present invention relates to a switching arrangement for controlling rpm, and in particular the rpm constancy between idling and full power of universal motors, in particular in electric tools.

BACKGROUND OF THE INVENTION

A switching arrangement is known from the 1991/92 data sheet "Integrated Circuits, Industrial Applications" of Telefunken Elektronik GmbH, Heilbronn, pp. 141 et. seq. With this known switching arrangement a phase-shift control circuit, also described there and embodied as an IC module U2008B, is used, in the exterior wiring of which a trimming potentiometer, which is fixedly set in correspondence to the load, or a fixedly preset resistor, are used for load current compensation. Such a control is customarily designed for the lowest rpm, because at the lowest rpm the motors react the most sensitively. With these known switching arrangements the load current compensation is optimal in a lower rpm range for which it is designed, but has practically no effect in the upper rpm ranges. In other words, the known switching arrangement cannot be optimally designed for the entire rpm range in which a universal motor can be manually set.

OBJECT AND SUMMARY OF THE INVENTION

It is therefore an object of the present invention to provide a switching arrangement of the type mentioned at the outset, by means of which an optimal readjustment while under a load in the entire rpm range provided can be attained.

This object is attained by a switching arrangement characterized in that between the tap of a voltage divider of the arrangement and the one output of the phase-control circuit (IC) of the arrangement, at least one further adjusting resistor is provided with which a preferably electronic circuit device, or switching device, is switched in parallel and is controlled from a point in the voltage divider.

By means of the steps in accordance with the present invention, for load current compensation it is possible to switch in or to bridge the further adjusting resistor. This means that at low rpm only the one adjusting resistor is connected, because the further adjusting resistor is short-circuited, while at higher rpm the further adjusting resistor is present in series with the one adjusting resistor and in this way an optimal load current compensation is possible even in the high rpm ranges. The provision of this optimal load current compensation in the entire rpm range provided can be achieved with a few inexpensive components. It is also possible to achieve this in two or more steps instead of one, in that more than one further adjusting resistor is provided, to which respectively a further electronic circuit device, or switching device, is connected in parallel, so that further adjusting resistors can be switched in or out in steps.

A preferred exemplary embodiment has been attained with a few inexpensive components, namely a transistor and resistor.

The transistor for switching the further adjusting resistor in or out can perform the function of a simple switch. The transistor can act as an amplifier, by means of which a variable control is achieved.

It is possible in connection with the known switching arrangement mentioned at the outset to realize, in place of the load current compensation, a switching arrangement with a soft start feature which consists of a capacitor which is disposed between the connection of the phase-control circuit and the grounded conductor of the power supply in place of the resistor for measuring the load current. However, in accordance with a further exemplary embodiment of the present invention, the soft start circuit is integrated into the exterior wiring for the load current compensation. In the course of this, the control value which affects the rpm is affected in an advantageous manner by the capacitor of the RC series connection which is charged via the resistor until the set rpm value has been reached.

For achieving the disconnection of the soft start circuit from the rpm control at this time, the RC series circuit is connected at an intermediate tap with the one output of the phase-control circuit via a decoupling diode.

Following the disconnection of the circuit the capacitor of the RC circuit which is important for the soft start is rapidly discharged so that another soft start is possible after a short disconnection. For this purpose a discharge diode is provided parallel to the resistor of the RC series circuit.

Further details of the present invention are to be taken from the subsequent specification wherein the present invention is described in detail and explained by means of the exemplary embodiments illustrated in the drawings.

DETAILED DESCRIPTION OF THE PREFERRED EMBODIMENTS

Figure 1:
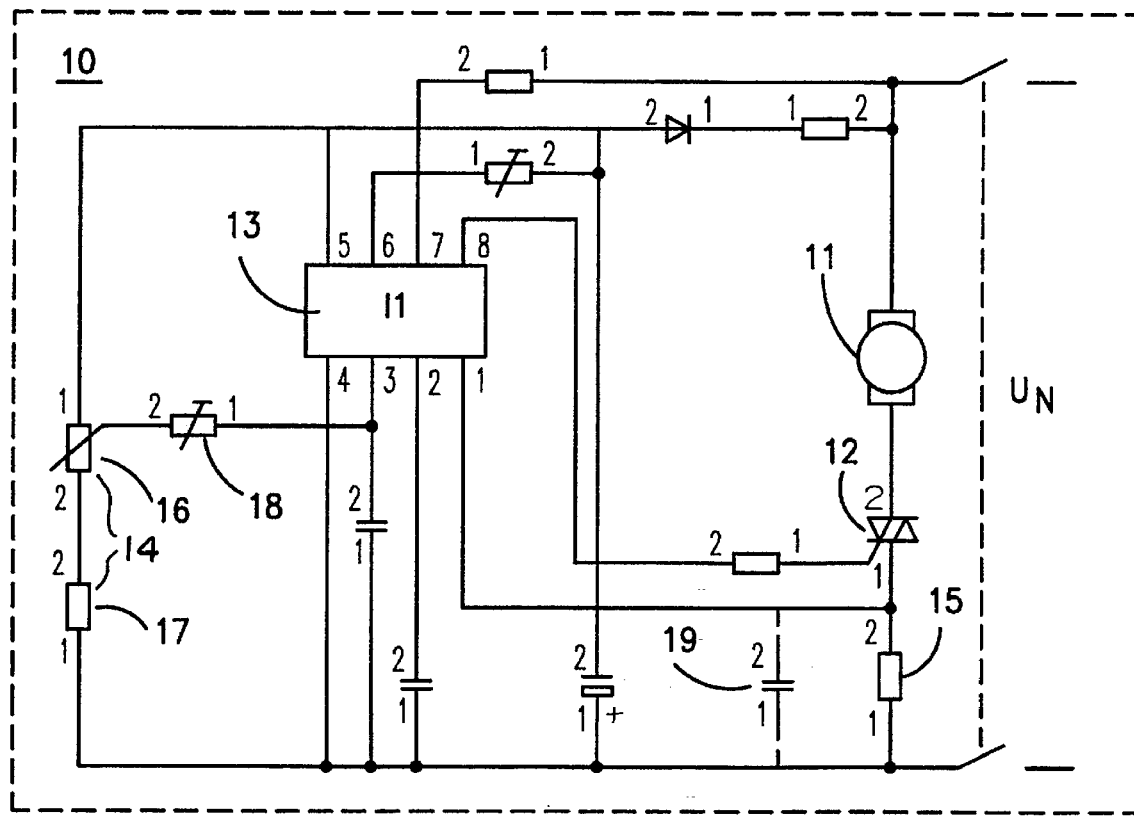
FIG. 1 is a circuit diagram of a known switching arrangement for rpm control as a function of the detected load current.

FIG. 1 illustrates a known switching arrangement 10 for the rpm control of a motor 11 operated at a power net-supplied voltage $U_N$ of, for example 220 Volts. A controllable power semiconductor in the form of a triac 12 is disposed in the motor circuit, which is controlled by a phase-control circuit 13 in both half waves of the power net-supplied voltage. A resistor 15 is additionally placed in series where the motor current at the connector 1 of the phase-control circuit is measured. The phase-control circuit 13 represented in a circuit diagram in FIG. 1, is embodied as an integrated circuit module (IC). The exterior wiring of the phase-control circuit 13, embodied as an IC, at the individual connectors 1 to 8 can also be taken from FIG. 1. Essential in this connection is the exterior wiring for rpm control based on a load current compensation. A voltage divider 14, having a potentiometer 16 for presetting the idle rpm and a fixed resistor 17 in a series connection, is provided parallel with the connectors 4 and 5. The tap of the potentiometer 16 leads via a fixedly set trimming resistor 18 to the connector 3 of the IC. The trimming resistor 18 is used as an adjusting resistor or load current compensating resistor and is fixedly set for the respective use in accordance with the lowest idle rpm to be preselected. The known switching arrangement can be used either for load current compensation or as a soft start circuit. A connection between the connecting point 1 of the IC and the grounded conductor of the power-net supplied voltage is shown in dashed lines, in which a capacitor 19 is disposed in place of the resistor 15 and which represents the soft start circuit of the known switching arrangement.

Figure 2:
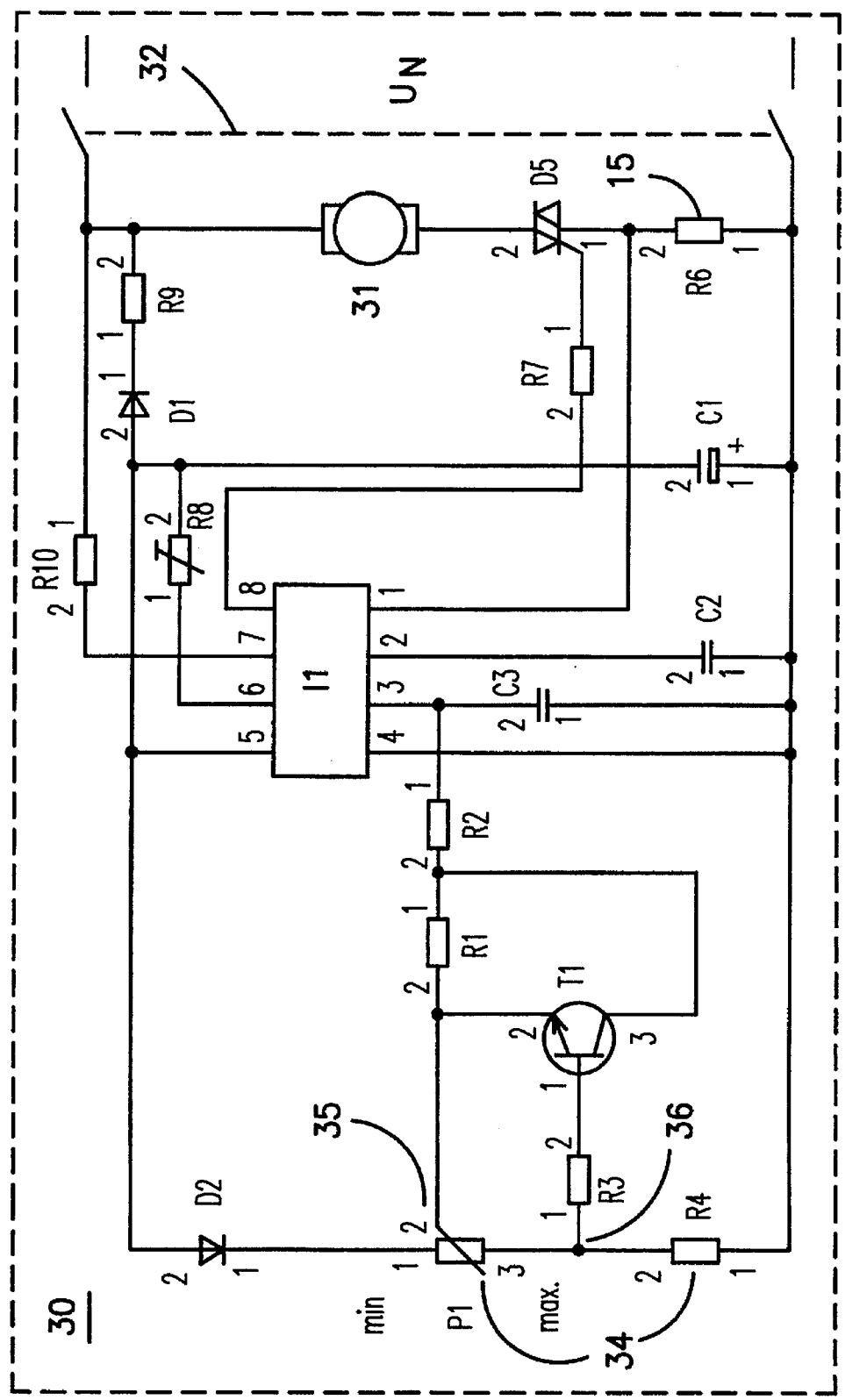
FIG. 2 is a circuit diagram of a switching arrangement for rpm control in accordance with a preferred embodiment of the present invention.

FIG. 2 shows an exemplary embodiment of a switching arrangement 30 in accordance with the present invention, which employs the integrated circuit module IC which provides the phase-control circuit for the switching arrangement 30. The exterior wiring of this IC of the switching arrangement 30 is essentially the same as far as the connectors 2, 4, 5, 6, 7 and 8 are concerned. The connector 2 of the IC is connected via a capacitor C2 with the grounded conductor to $U_N$, and the connector 4 is connected directly. The connector 5 is directly connected with a series connection of a diode D1 and a resistor R9, and the connector 6 is connected with it via a resistor R8. This series connection D1, R9, the same as a resistor R10 connected with the connector 7, are connected with the phase of the power net-supplied voltage $U_N$. The connector 8 of the IC leads via a preresistor R7 to the control connector of the triac D5 which lies in series with the motor 31.

In the exemplary embodiment, the connector 1 of the IC leads via a resistor R6 to the ground conductor of the power-net supplied voltage $U_N$, wherein the resistor is switched in series with the triac D5, the same as is the case in the prior art when the circuit is used as load current compensation without soft start, i.e. when the capacitor 19 is not provided.

In the exemplary embodiment illustrated in FIG. 2 the voltage divider 34 has a potentiometer P1 and a fixed resistor R4 connected in series, wherein furthermore a Zener diode D2 is series-connected with this series connection in the manner shown. This entire series connection consisting of the Zener diode D2, the potentiometer P1 and the resistor R4 lies parallel to or between the connectors 5 and 4 of the IC. The tap 35 of the potentiometer P1, which is used for presetting the idle rpm, is connected via a series connection of two resistors R1 and R2 directly with the connector 3 of the IC. The two resistors R1 and R2 are fixedly preset and have the function of control or load current compensating resistors. The emitter-collector path of a transistor T1, whose base is connected via a resistor R3 with a point 36 between the potentiometer P1 and the resistor R4 of the voltage divider 34, is disposed parallel with the resistor R1.

The function of the just described control circuit is as follows: since the base of the transistor T1 is controlled via the base resistor R3 from a point 36 of the voltage divider 34, and since the resistor R1 lies in the transistor circuit, it is possible to change the value of the sum of the two load current compensating resistors R1 and R2. The potential of the point 35 changes with the position of the tap at the potentiometer P1. For example, the circuit element is laid out in such a way that in the position "max" of the potentiometer P1 the transistor T1 blocks, so that the load current compensation resistance consists of the sum of the two resistance values of R1 and R2. This corresponds to a maximum readjustment of the rpm under load. In the position "min" of the potentiometer P1, however, the transistor T1 is triggered in such a way that it opens and in this way short- circuits the additional resistor R1. This means that only the resistor R2, i.e. a considerably lesser resistance value, comes into effect for the control in the operation under load. In intermediate positions of the potentiometer P1, the transistor T1 acts as an amplifier, as a result of which a variable setting of the resistance values which apply to the load current compensation is achieved.

In accordance with a further exemplary embodiment, not shown, of the present invention, the base resistor R3 is bridged or omitted, which here means that the transistor T1 is operated as a switch, i.e. it either connects the resistor R1 fully for load current compensation or short-circuits it.

A further option consists in providing two or more additional resistors for load current compensation, each one of which is respectively switched in or out with the aid of a transistor, wherein each transistor is controlled by means of a different base potential.

It is furthermore understood that in place of the npn transistor illustrated in FIG. 2, other transistors can be employed, such as field effect transistors.

Figure 3:
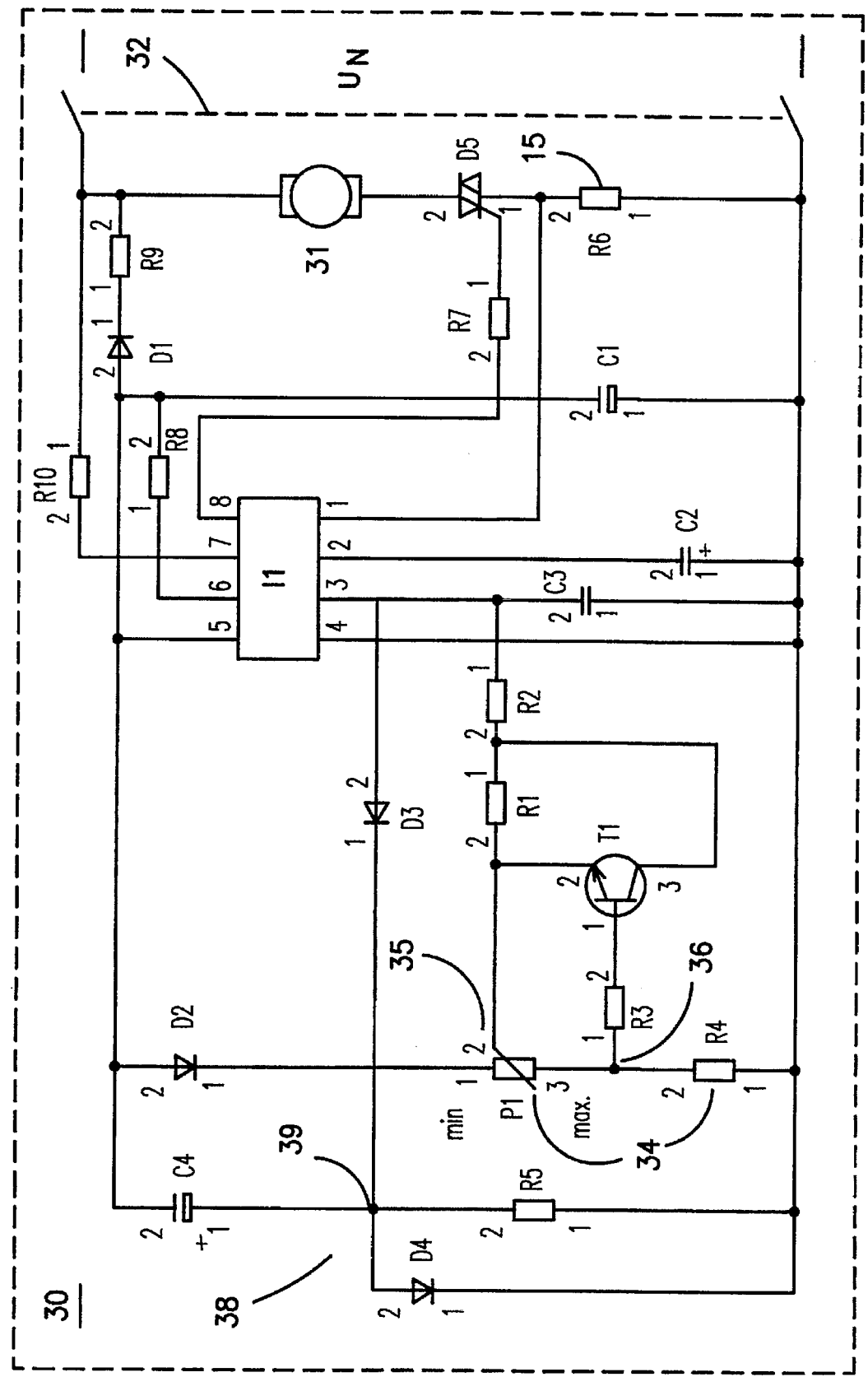
FIG. 3 is a circuit diagram corresponding to FIG. 2, but only partially represented and supplemented by a soft start circuit.

In accordance with FIG. 3, a soft start circuit 38 is additionally integrated in the load current compensation circuit in accordance with the present invention, which has a capacitor C4, a resistor R5 connected in series therewith, a diode D3 and a diode D4. The series connection of the capacitor C4 and the resistor R5 is disposed parallel with the series connection of the voltage divider 34 and the Zener diode D2, and therefore between the connectors 5 and 4 of the IC. The diode D4 is disposed between the connector 4 of the IC or between the ground conductor of $U_N$ and an intermediate tap 39 between the capacitor C4 and the resistor R5. In contrast thereto, the diode D3 is disposed between the intermediate tap 39 and the connector 3 of the IC.

In this second exemplary embodiment of FIG. 3, the voltage of the motor 31 to be controlled, and thus the control value influencing the rpm, is additionally affected by the capacitor C4. The capacitor C4 is first discharged. Following the turning on of the switch 32 of the respective device, the capacitor C4 is charged by means of the resistor R5. The control value affecting the rpm is influenced by the capacitor C4 until the rpm value preset by the potentiometer P1 has been attained. After this time further charging of the capacitor C4 is no longer of importance, because the diode D3 causes the uncoupling of the soft start circuit 38 from the circuit for load current compensation. After turning off the switch 32, the capacitor C4 is rapidly discharged via the diode D4 so that it is assured that a new soft start is again possible following the brief shut-off of the motor 31.

What is claimed is:

1. A switching arrangement for controlling rpm of an electric motor having an electronic power switch, comprising:

a voltage divider connected to an electric motor;

an IC phase-shift control circuit connected to the electric motor and said voltage divider, the trigger output of said IC phase-shift control circuit controlling the electronic power switch;

an adjusting resistor connected to said IC phase-shift control circuit;

at least one further adjusting resistor connected between said voltage divider and said adjusting resistor, said adjusting resistor and said at least one further adjusting resistor serving for setting a set value of the rpm; and a switching device connected in parallel with said at least one further adjusting resistor and to said voltage divider.

2. The switching arrangement as defined in claim 1, wherein said electronic circuit device comprises a transistor between whose emitter and collector said at least one further adjusting resistor is connected and whose base is connected to said voltage divider.

3. The switching arrangement as defined in claim 2, further comprising:

a still further resistor connected between the base of said transistor and said voltage divider.

4. The switching arrangement as defined in claim 1, further comprising:

a zener diode connected in series with said voltage divider.

5. A switching arrangement for controlling rpm of an electric motor having an electronic power switch, comprising:

a voltage divider connected to an electric motor;

an IC phase-shift control circuit connected to the electric motor and said voltage divider, the trigger output of said IC phase-shift control circuit controlling the electronic power switch;

an adjusting resistor connected to said IC phase-shift control circuit;

at least one further adjusting resistor connected between said voltage divider and said adjusting resistor, said adjusting resistor and said at least one further adjusting resistor serving for setting a set value of the rpm;

a switching device connected in parallel with said at least one further adjusting resistor and to said voltage divider; and an RC series circuit connected in parallel with said voltage divider, said RC series circuit serving as a soft starting circuit.

6. The switching arrangement as defined in claim 5, further comprising:

a decoupling diode connected to said IC phase-shift control circuit and to the intermediate tap of said RC series circuit.

7. The switching arrangement as defined in claim 5, further comprising:

a discharge diode connected in parallel with the resistor of said RC series circuit.

8. The switching arrangement as defined in claim 6, further comprising:

a discharge diode connected in parallel with the resistor of said RC series circuit.

\* \* \* \* \*